(12) United States Patent
Rimanelli

(10) Patent No.: US 9,623,968 B2
(45) Date of Patent: Apr. 18, 2017

(54) UNMANNED AIR-GROUND VEHICLE

(71) Applicant: Jon Rimanelli, Grosse Pointe Woods, MI (US)

(72) Inventor: Jon Rimanelli, Grosse Pointe Woods, MI (US)

(*) Notice: Subject to any disclaimer, the term of this patent is extended or adjusted under 35 U.S.C. 154(b) by 203 days.

(21) Appl. No.: 14/538,466

(22) Filed: Nov. 11, 2014

(65) Prior Publication Data

US 2016/0130000 A1    May 12, 2016

(51) Int. Cl.
*B64C 39/00* (2006.01)
*B64C 39/02* (2006.01)
*B60F 5/02* (2006.01)
*B62D 55/10* (2006.01)

(52) U.S. Cl.
CPC .............. *B64C 39/024* (2013.01); *B60F 5/02* (2013.01); *B62D 55/10* (2013.01); *B64C 2201/024* (2013.01); *B64C 2201/066* (2013.01); *B64C 2201/108* (2013.01); *B64C 2201/126* (2013.01); *B64C 2201/146* (2013.01); *B64C 2201/20* (2013.01)

(58) Field of Classification Search
CPC .................................... B60F 5/02; B64C 37/00
See application file for complete search history.

(56) References Cited

U.S. PATENT DOCUMENTS

| 3,761,040 | A | * | 9/1973 | Cummins | ................. | B60F 5/02 |
| | | | | | | 180/9.1 |
| 7,959,104 | B2 | | 6/2011 | Kuntz | | |
| 8,205,820 | B2 | * | 6/2012 | Goossen | ................. | B64C 37/00 |
| | | | | | | 244/110 E |
| 2014/0061362 | A1 | | 3/2014 | Olm et al. | | |
| 2015/0093956 | A1 | * | 4/2015 | Mielniczek | ............ | A63H 27/12 |
| | | | | | | 446/37 |
| 2016/0121673 | A1 | * | 5/2016 | Hutson | ..................... | B60F 5/02 |
| | | | | | | 244/62 |
| 2016/0122015 | A1 | * | 5/2016 | Hutson | ................. | B64C 39/024 |
| | | | | | | 244/17.23 |

FOREIGN PATENT DOCUMENTS

| CN | 103171388 | A | 6/2013 |
| CN | 103522855 | A | 1/2014 |
| CN | 203447765 | U | 2/2014 |
| CN | 203449868 | U | 2/2014 |
| GB | 2502167 | A | 11/2013 |

* cited by examiner

*Primary Examiner* — Philip J Bonzell
*Assistant Examiner* — Michael Kreiner
(74) *Attorney, Agent, or Firm* — Brooks Kushman P.C.

(57) ABSTRACT

An unmanned air-ground vehicle is provided. The unmanned air-ground vehicle includes a frame having a center portion connecting two substantially parallel transversely spaced apart track supports. Tracks that generally form loops are disposed about the track supports. Track drive motors are connected to the frame and configured to propel the tracks about the track supports. A plurality of propellers, each having propeller drive motors, are attached to the frame and disposed within the loops formed by the tracks. The tracks are configured to propel the vehicle in a ground mode while the propellers are configured to propel the vehicle in a flying mode.

20 Claims, 9 Drawing Sheets

UNMANNED AIR-GROUND VEHICLE

TECHNICAL FIELD

The present disclosure relates to unmanned air-ground vehicles.

BACKGROUND

Unmanned vehicles, also known as robots or drones, may be utilized for various purposes including various delivery services, law enforcement, surveillance, and military operations. Most robots are dedicated ground vehicles while most drones are dedicated aerial vehicles. A limited number of unmanned air-ground vehicles combine the functions of ground and aerial vehicles.

SUMMARY

In one aspect of the disclosure, an unmanned air-ground vehicle is provided. The unmanned air-ground vehicle includes a frame having a center portion connecting two substantially parallel transversely spaced apart track supports. Tracks that generally form loops are disposed about the track supports. Track drive motors are connected to the frame and configured to propel the tracks about the track supports. A plurality of spaced apart propellers each having propeller drive motors are attached to the frame and disposed within the loops formed by the tracks. The tracks are configured to propel the vehicle in a ground mode while the propellers are configured to propel the vehicle in a flying mode.

In another aspect of the disclosure, a vertical take-off and landing unmanned air-ground vehicle is provided. The vertical take-off and landing unmanned air-ground vehicle includes a frame having a center portion and two substantially parallel transversely spaced apart side portions connected to the center portion. A ground drive is attached to the side portions and is configured to propel the vehicle in a ground mode. The ground drive may include wheels or tracks and associated drive motors. A plurality of propellers each having propeller drives are attached to the frame and disposed within the side portions. The plurality of propellers are configured to propel the vehicle in a flying mode. The propeller blades are configured to shift into parked positions, the parked positions ranging from substantially parallel to the side portions of the frame to substantially perpendicular to the side portions of the frame, so that the blades do not extend laterally outward substantially beyond the frame, when the vehicle is operating in the ground mode.

In yet another aspect of the disclosure, a vertical take-off and landing unmanned air-ground vehicle is provided. The vertical take-off and landing unmanned air-ground vehicle includes a frame having a center portion, two side portions, and a collapsible mechanism that connects the side portions to the center portion. The collapsible mechanism enables the side portions to shift from a ready position where the two side portions are substantially parallel to a storage position. A ground drive attached to the side portions is configured to propel the vehicle in a ground mode. A plurality of propellers each having propeller drives are attached to the frame and disposed within the side portions. The plurality of propellers are configured to propel the vehicle in a flying mode. A battery is attached to the frame and configured to provide power to the ground drive and propeller drives. Various payloads such as a camera are attachable to the frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
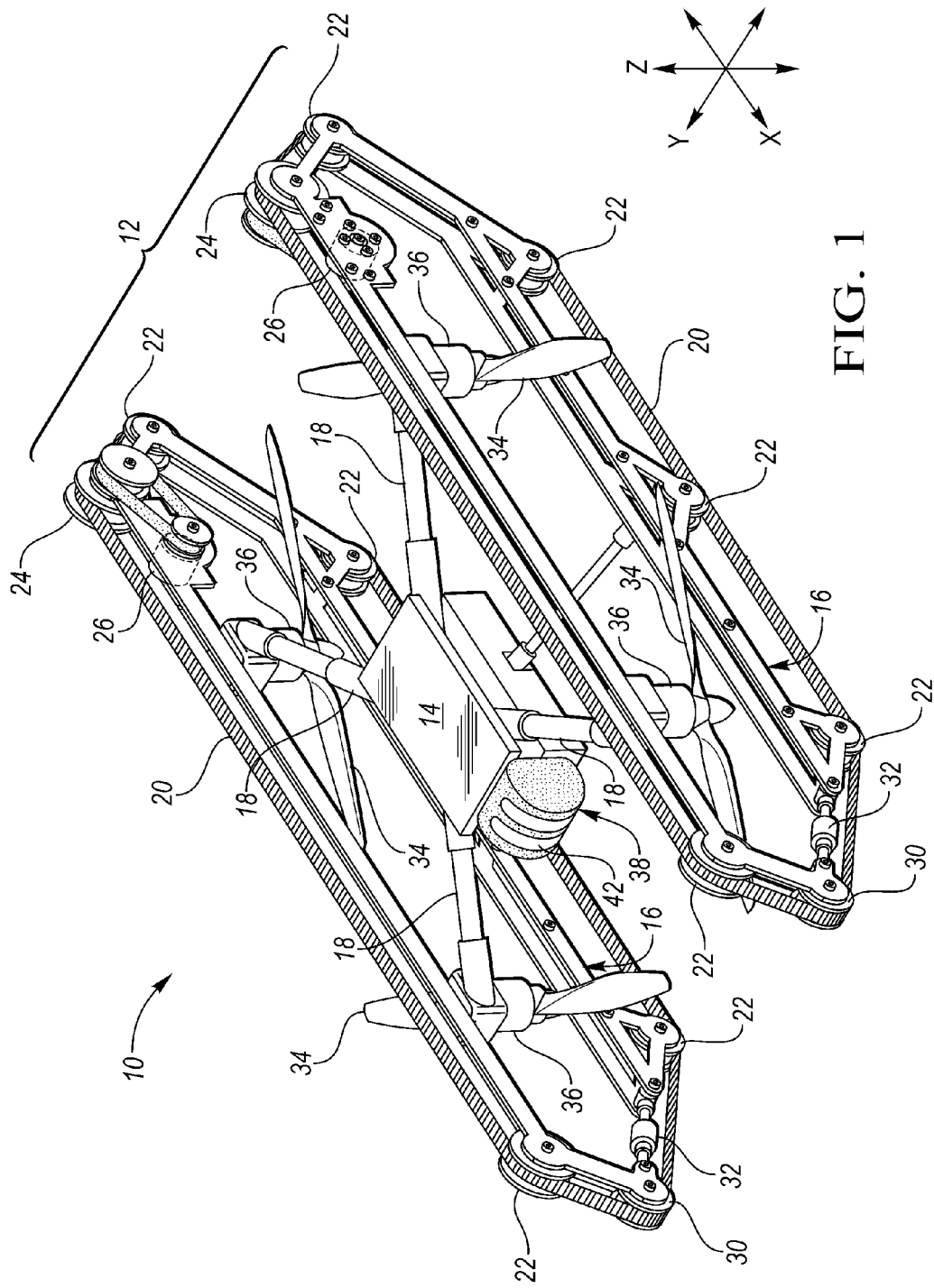
FIG. 1 is an isometric view of an unmanned air-ground vehicle.

Referring to FIG. 1, an unmanned air-ground vehicle 10 (hereinafter "vehicle") is illustrated. The vehicle 10 may be capable of vertical take offs and landings. The vehicle 10 includes a frame 12. The frame 12 includes a center portion 14 and two side portions 16. A series of cross members 18 may be used to connect the center portion 14 of the frame 12 to the side portions 16. The two side portions 16 may be substantially parallel and transversely spaced apart from each other. The side portions 16 may also be track supports 16, each supporting a track 20. The elements of the frame 12, including the center portion 14, side portions 16, and cross members 18, may be made from any structural material such as metals (including steel, titanium, aluminum), metal alloys, plastics (including thermoplastics and thermosetting resins and polymers), fiber reinforced polymers (including carbon fibers, glass fibers, basalt fibers, aramid fibers or other structural fibers reinforced in epoxy, vinylester, polyester thermosetting plastic, phenol formaldehyde resins, or other thermosetting plastic), or any other structural material or composite material that may be appropriate when taking into account costs and weigh restrictions.

The tracks 20 are configured to propel the vehicle 10 over the ground when the vehicle 10 is operating in a ground mode. The tracks 20 may be continuous tracks that generally form loops and are disposed about the track supports 16. The tracks 20 may be made from a rubber or plastic material that may be reinforced with a metal wire, such as steel wire. This may include using a cog belt as the tracks 20, with the cogs facing outward for traction. In the alternative, the tracks 20 may be made from a series of linked metal pieces or plates, such as steel plates. This may include using tank tread or caterpillar track for the tracks 20.

The track supports 16 may also support a series of wheels, sprockets, or pulleys that are used to propel and guide the tracks 20 about the track supports 16. For simplicity purposes, the wheels, sprockets, or pulleys that are used to propel and guide the tracks 20 about the track supports 16 will be referred to solely as wheels 22. At least one of the wheels 22 on each track support 16 may be drive wheel 24 that is drivably connected to a track drive motor 26. The drive wheels 24 and the track drive motors 26 may be connected via a pulley and belt (or sprocket and chain) system that may have a gear or speed reduction ratio. In the alternative a gearing connection, such as a gearbox, may be used to connect the drive wheels 24 and the track drive motors 26. The gearing connection may have a gear or speed reduction. In yet another alternative, the drive wheels 24 may be directly connected to the drive motors 26.

At least one of the wheels 22 on each track support 16 may be an idler wheel 30 that is used to tension the track 20 to prevent the track 20 from slipping or being thrown off of the wheels 22. The idler wheel 30 may be connected to tensioner 32 that provides the tension force. The tensioner 32 may include a gas spring, a linear spring, torsional spring, or any other device capable of providing tension force to the tracks 20 via the idler wheel 30.

Other forms of ground drives, other than tracks, may be utilized to propel the vehicle 10 when the vehicle 10 is operating in the ground mode. For example, a series of wheels that propel the vehicle 10 over the ground may be connected to the side portions 16 of the frame 12. In this configuration, at least one wheel on each side portion 16 may be a drive wheel that is drivably connected to a drive motor. The drive wheels may be connected to the drive motors via a pulley and belt (or sprocket and chain) system that may have a gear or speed reduction ratio. In the alternative a gearing connection, such as a gearbox, may be used to connect the drive wheels and the drive motors. The gearing connection also may have a gear or speed reduction. In yet another alternative, the drive wheels may be directly connected to the drive motors.

Another example of a ground drive may include a series of walking legs that may be connected the frame 12 that are utilized to walk the vehicle 10 over the ground when the vehicle 10 is operating in the ground mode. Examples of walking legs are disclosed in U.S. Pat. No. 6,481,513, U.S. Pat. No. 6,238,264, and U.S. Pat. No. 5,127,484. The disclosures of U.S. Pat. No. 6,481,513, U.S. Pat. No. 6,238,264, and U.S. Pat. No. 5,127,484 are incorporated herein by reference in their entirety.

The disclosure should not be construed as limited to ground drives that include tracks, wheels, or walking legs, but should include any ground drive or combination of ground drives that are capable of moving the vehicle 10 over the ground when the vehicle 10 is operating in the ground mode.

With continued reference to FIG. 1, the vehicle 10 may also include a plurality of propellers 34 that are attached to the frame 12 and disposed within the side portions 16 of the frame. In the embodiment that includes tracks 20, the propellers 34 may be attached to the frame 12 and disposed within the track supports 16 and the loops that are generally formed by the tracks 20. The plurality of propellers 34 each have a propeller drive 36, which may be a propeller drive motor 36, that is configured to rotate the propellers 34 in order to propel the vehicle 10 in a flying mode. Although four propellers 34 are depicted in FIG. 1, the disclosure should be not be construed as limited to unmanned air-ground vehicles having four propellers, but should be construed to include unmanned air-ground vehicles having one or more vertical axis propellers, and preferably three or more spaced apart vertical axis propellers.

The propellers 34 may be made from any material such as metals (including steel, titanium, and aluminum), metal alloys, plastics (including thermoplastics and thermosetting resins and polymers), fiber reinforced polymers (including carbon fibers, glass fibers, basalt fibers, aramid fibers or other structural fibers reinforced in epoxy, vinylester, polyester thermosetting plastic, phenol formaldehyde resins, or other thermosetting plastic), or any other material or composite material that may be appropriate when taking into account the costs, weigh restrictions, and functionality of the propellers.

Figure 2A:
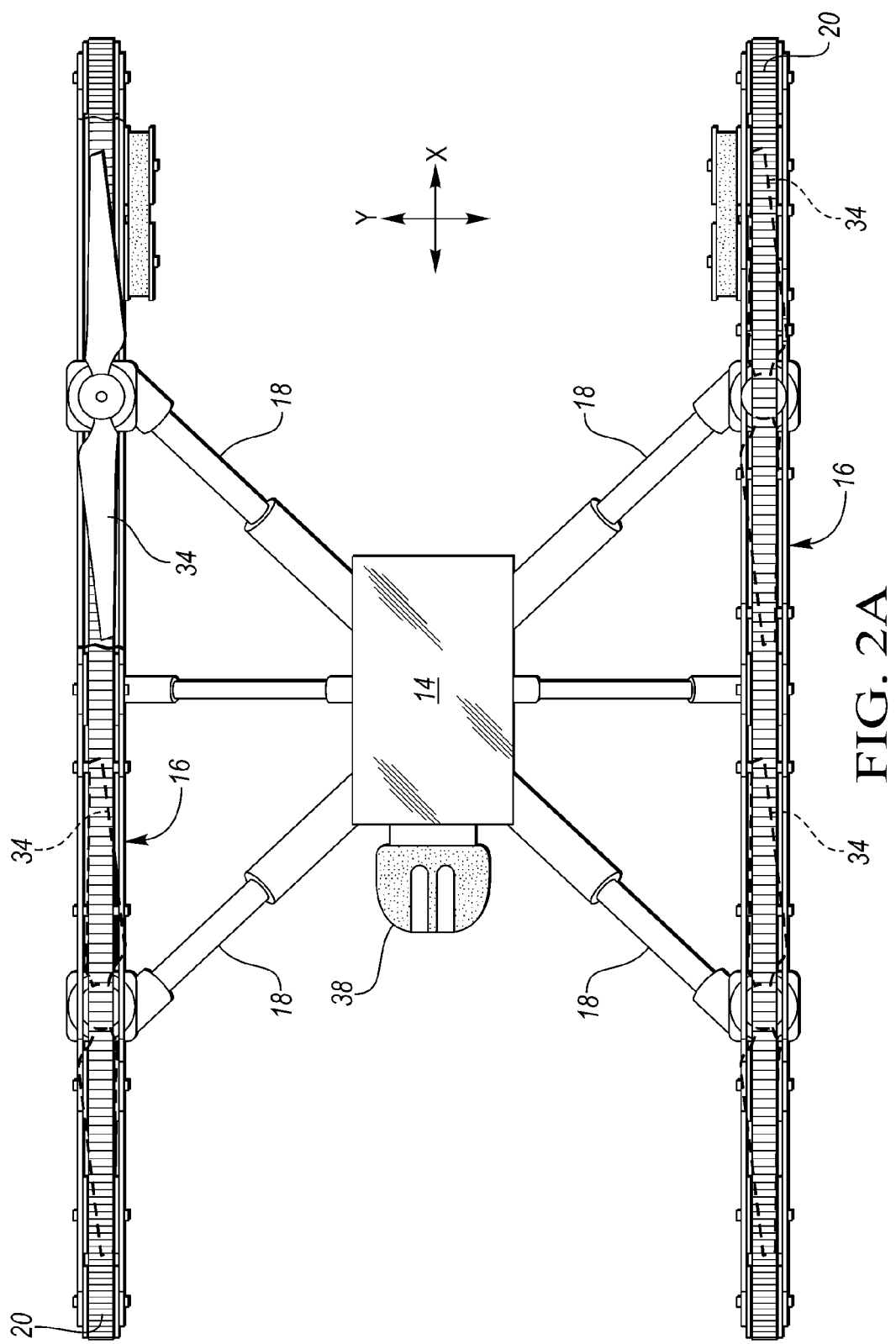
FIG. 2a is a top view of the unmanned air-ground vehicle illustrating the propellers parked in storage positions.
Figure 2B:
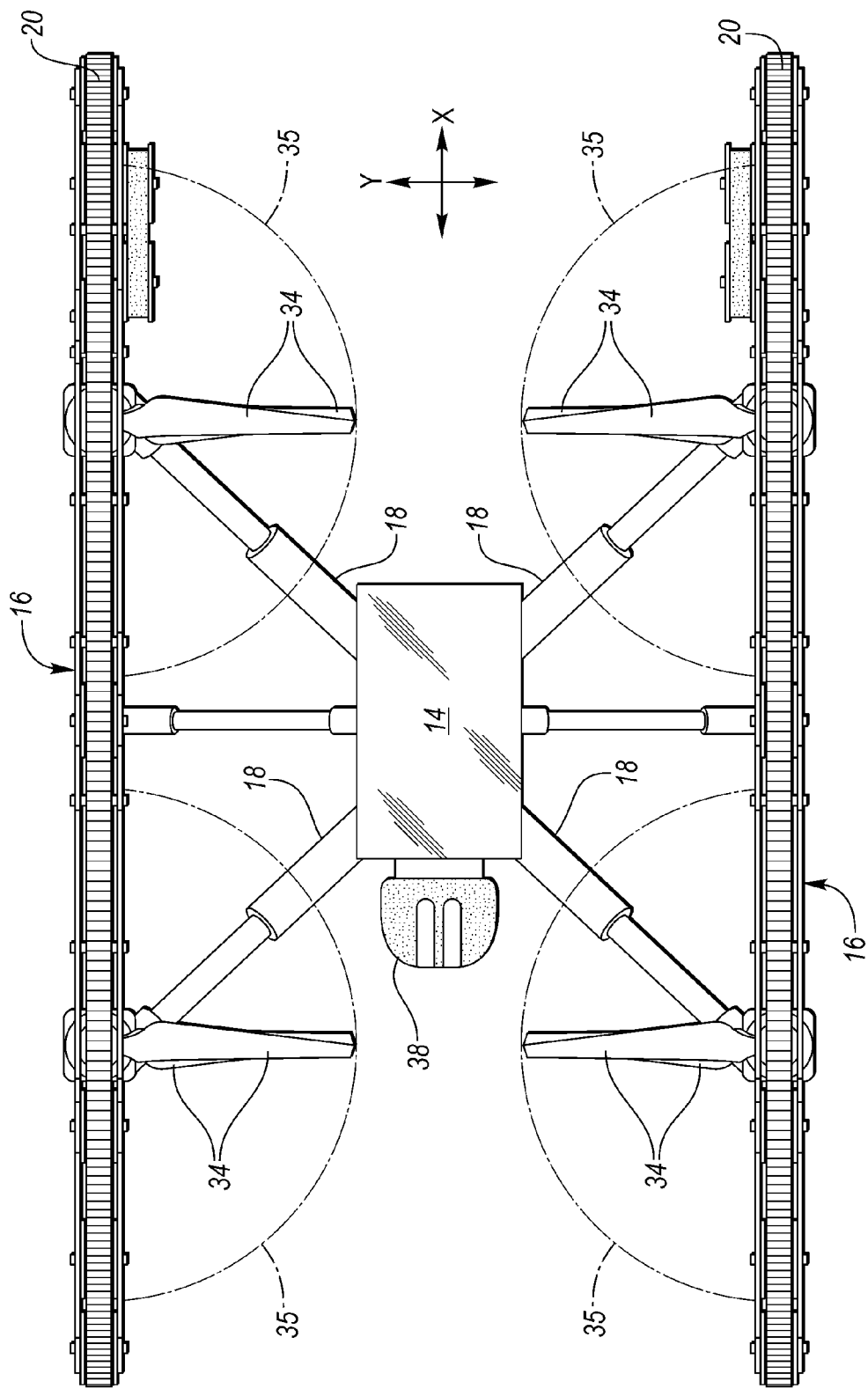
FIG. 2b is a top view of the unmanned air-ground vehicle illustrating an alternative configuration of the propellers, where the propellers of the alternative configuration are parked in storage positions.

Referring to FIG. 2a, the propellers 34 are shown in storage or parked positions where the propellers 34 are substantially parallel to the side portions 16 (or track supports 16) of the frame 12. A portion of the upper part of the track 20 and track support 16 has been cut out in FIG. 2a to illustrate the parked position of one of the propellers 34. The view in FIG. 2a includes The storage or parked positions ensure a smaller footprint of the vehicle 10 when it is operating in the ground mode and also prevents the propellers 24 from becoming entangled with obstacles when the vehicle 10 is operating in the ground mode. The propellers 34 in FIG. 2a are shown as a dual blade propeller design comprised as single solid pieces. However, the propellers 34 may include multiple blades of two or more that are configured to either fold into positions where the multiple blades overlap each other or where the multiple blades shift to positions that point in the same direction when the propellers 34 are not propelling the vehicle 10 in the flying mode. Such an alternative configuration where multiple propeller blades are in a folded position or rotated to point in the same direction is illustrated in FIG. 2b. The propeller blades may be positioned in storage or parked positions that range from substantially parallel to the side portions 16 of the frame 12 to substantially perpendicular to the side portions 16 of the frame 12, so that the blades do not extend laterally outward substantially beyond the frame 12. The range of storage or parked positions of the propeller blades is illustrated by the line 35.

Figure 3:
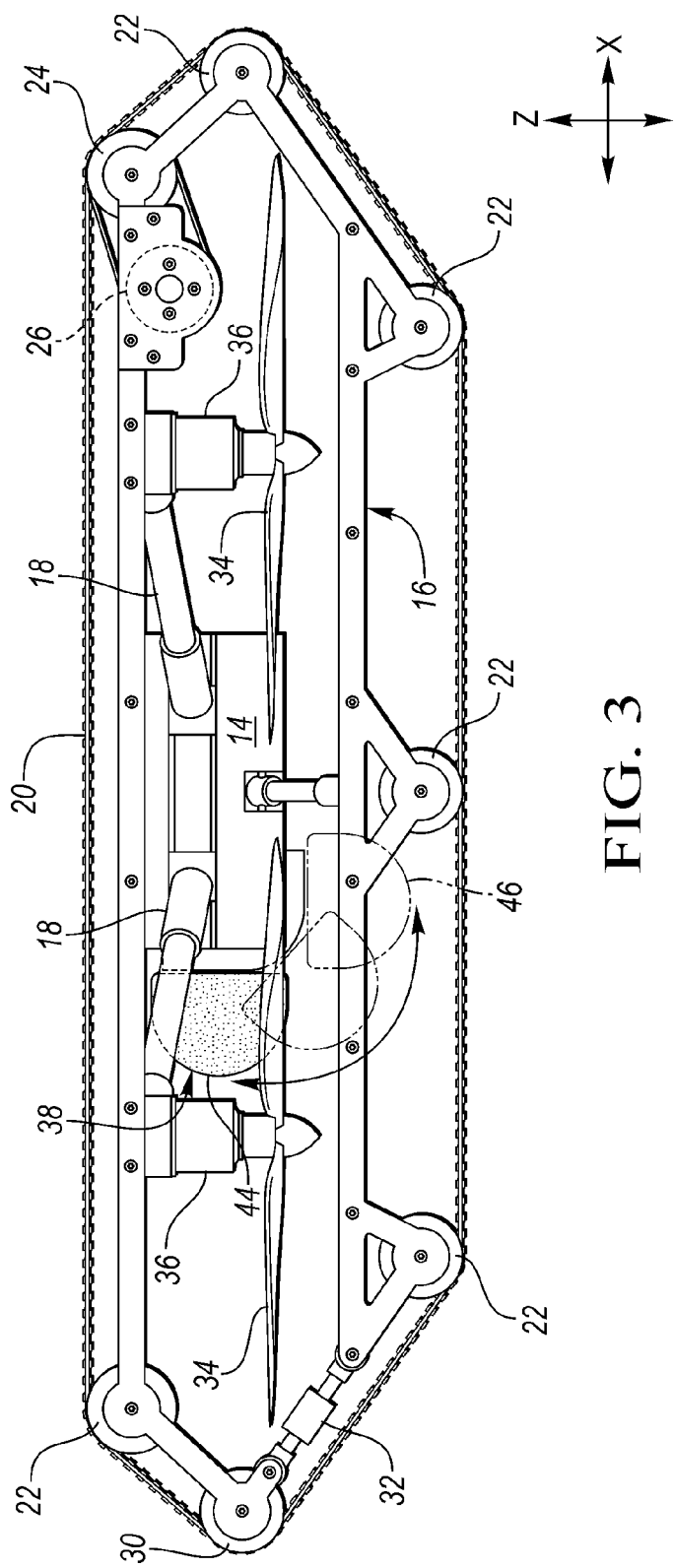
FIG. 3 is a side view of the unmanned air-ground vehicle illustrating an image capturing device that is capable of shifting between multiple positions.
Figure 4:
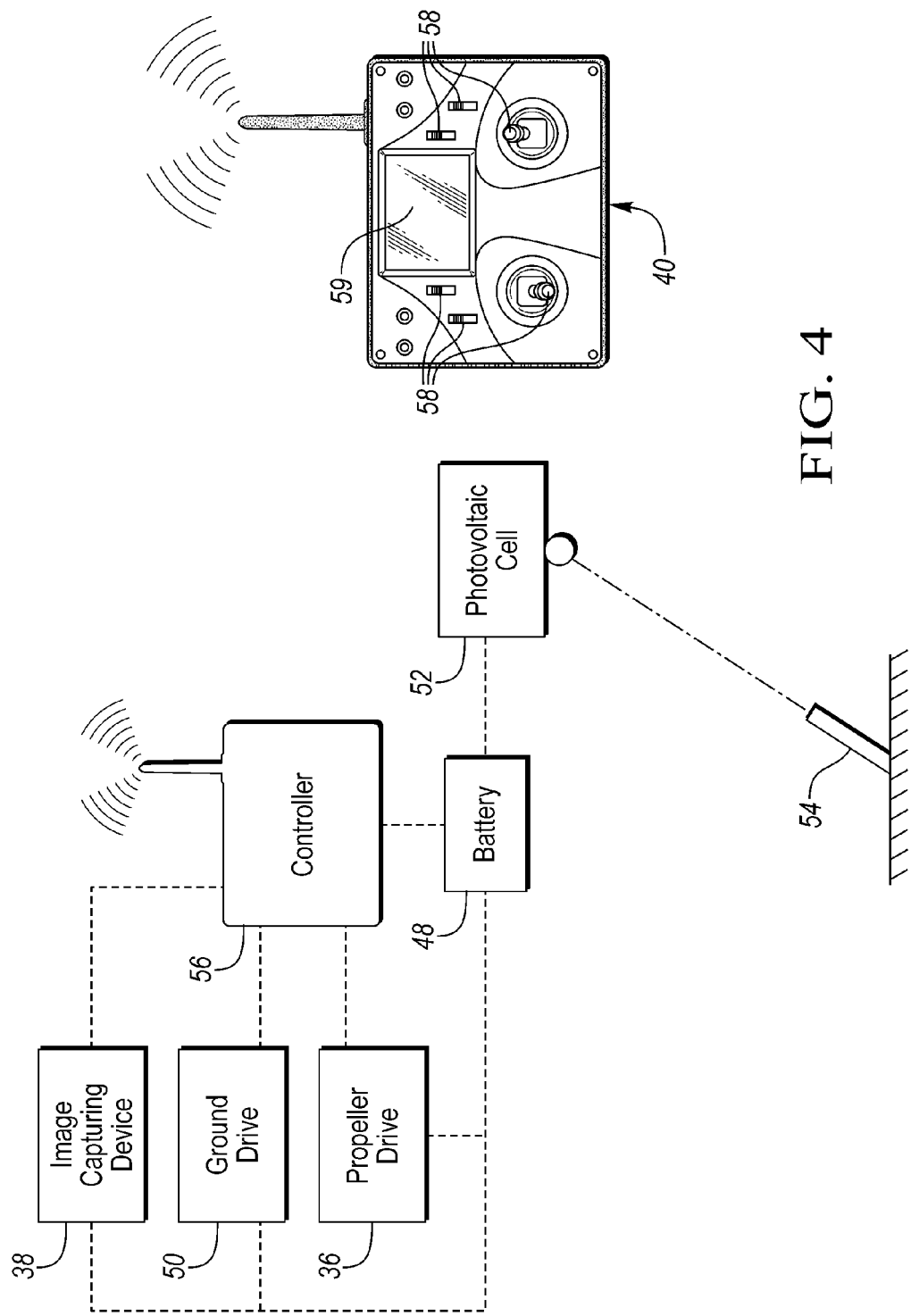
FIG. 4 is a flow chart illustrating the electrical and control systems of the unmanned air-ground vehicle.
Figure 5:
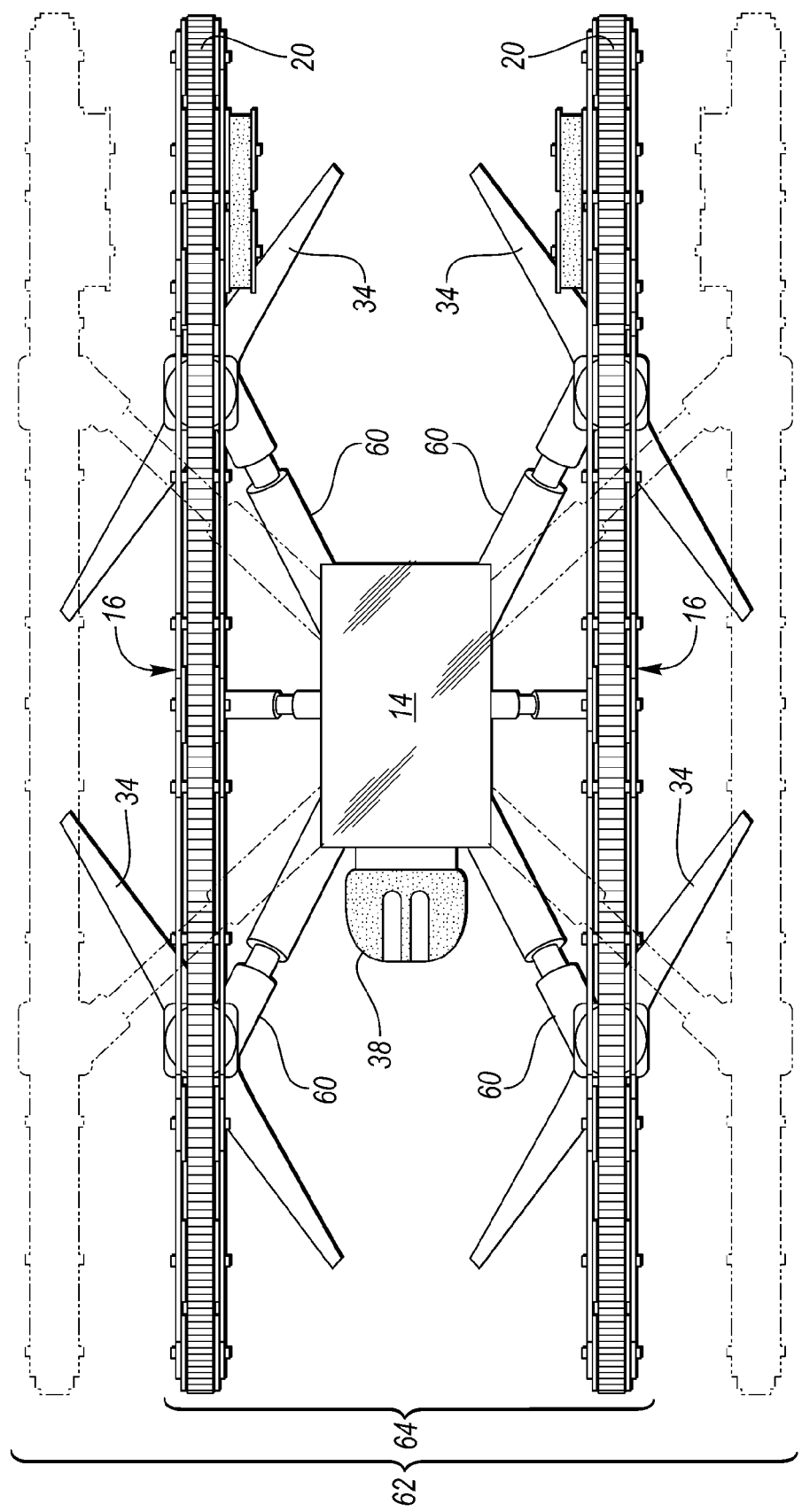
FIG. 5 is a top view of the unmanned air-ground vehicle illustrating a collapsible mechanism that allows the unmanned air-ground vehicle to shift from a ready position to a storage position.

Referring to FIGS. 1-3, the vehicle 10 may also include an image capturing device, such as a camera, 38 that provides feedback to a human machine interface (HMI) 40 (See FIG. 4). The image capturing device 38 may provide video, infrared, or other forms of imaging back to the HMI 40.

The image capturing device 38 may be capable of rotating about several axes to increase the field of view. The image capturing device 38 illustrated in FIG. 1 is attached to the front side of the center portion 14 of the frame 12. The image capturing device 38 has panes 42 that allow an internally mounted lens to view the surrounding environment. The lens may rotate along the Y axis increasing the field of view through the panes 42. The image capturing device 38 may also be mounted to a rotating device that allows the image capturing device 38 to rotate along the X axis also increasing the field of view. In addition, a second image capturing device (not show) may be mounted to the back side of the center portion 14 of the frame 12 to further increase the field of view. Referring now to FIG. 3, the image capturing device 38 may also be mounted to a shifting device that allows the image capturing device to transition from a front position 44 along the front side of the center portion 14 of the frame 12 to a lower position 46 along the lower side of the center portion 14 of the frame 12, again further increasing the field of view of the image capturing device 38.

The disclosure however, should not be limited to the type of image capturing devices and devices that increase the field of view of the image capturing device described herein, but should include any type of image capturing device and any type of rotating, sliding, or other mechanism that increases the field of view of an image capturing device 38. For example the image capturing device 38 depicted in FIG. 3 may also include an upper position where the camera may be shifted to an upper position along the top side of the center portion 14 of the frame 12.

Referring to FIG. 4, a flow chart of the electrical and control system of the unmanned air-ground vehicle 10 is illustrated. A battery 48 may be used to supply to power the propeller drives 36, which may include propeller motors, when the vehicle 10 is operating in a flying mode. The battery 48 may also be used to supply power to the ground drives 50. The ground drives 50 may include motors, such as the track drive motors 26, to propel wheels or tracks when the vehicle 10 is operating in the ground mode. The battery 48 may be attached to the frame 12, or more specifically may be housed in the center portion 14 of the frame 12. The battery 48 may be recharged by plugging the battery 48 into a power outlet or via a photovoltaic cell 52. The photovoltaic cell 52 may be capable of recharging the battery 48 when a laser beam is directed onto the photovoltaic cell 52 (also known as power beaming). Power beaming may be used while the vehicle 10 is not operating or while the vehicle 10 is operating in either the flying mode or ground mode. Alternative power sources, such as an internal combustion engine (ICE), may be used in place of a battery to power the propeller drives 36 and the ground drives 50. Alternatively, various combinations of power sources may be used such as an electrical/ICE hybrid having a quiet electric mode and a long range ICE mode.

A controller 56 is configured to control the ground drives 50 and propeller drives 36 of the vehicle 10, when the vehicle 10 is either in the ground mode or the flying mode. The controller 56 may include a receiver and transmitter (or alternatively a transceiver) for communicating with the HMI 40. The HMI 40 may also include a receiver and transmitter (or alternatively a transceiver) for communicating with the controller 56. The controller 56 and HMI 40 may communicate with each other via wireless network technology, Bluetooth® technology, infrared transmission technology, radio frequency, or any other form of wireless communication.

The HMI 40 may include a series of control buttons, levers, or other devices (control devices 58) that are configured to communicate a user input to the HMI 40. The HMI 40 may then communicate the user input to the controller 56, which is located on the vehicle 10, allowing a user to remotely control the vehicle 10 when the vehicle 10 is operating in the ground mode or flying mode.

The controller 56 may further transmit video, infrared, or other forms of imaging from the image capturing device 38 back to an imaging display device 59, which may be located on the HMI 40.

While illustrated as one controller, the controller 56 may be part of a larger control system and may be controlled by various other controllers throughout the vehicle 10. It should therefore be understood that the controller 56 and one or more other controllers can collectively be referred to as a "controller" that controls various actuators, drives, motors, etc. in response to various sensors, inputs, signals, etc. The controller 56 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 56 in controlling the vehicle 10.

The vehicle 10 may also include a collapsible mechanism 60 that allows the side portions (or track supports) 16 of the frame 12 to shift from ready position 62 to a storage position 64. The collapsible mechanism 60 may (instead of the cross members 18) connect the side portions 16 of the frame 12 to the center portion 14 of the frame 12. The collapsible mechanism 60 may be comprised of a telescoping mechanism that is configured to allow the side portions 16 of the frame 12 to extend away from the center portion 14 when moving into the ready position 62, and collapse inward toward the center portion 14 of the frame 12 when moving into the storage position 64. The collapsible mechanism 60, however, should not be limited to telescoping mechanisms, but should include any mechanism that is configured to decrease the footprint of the vehicle 10 or an area or space required to store the vehicle 10 when the vehicle 10 transitions from the ready position 62 to the storage position 64. Alternative embodiments may include various configurations of links and pivots that allow the side portions 16 of the vehicle 10 to transition into a storage position from a ready position.

Figure 6:
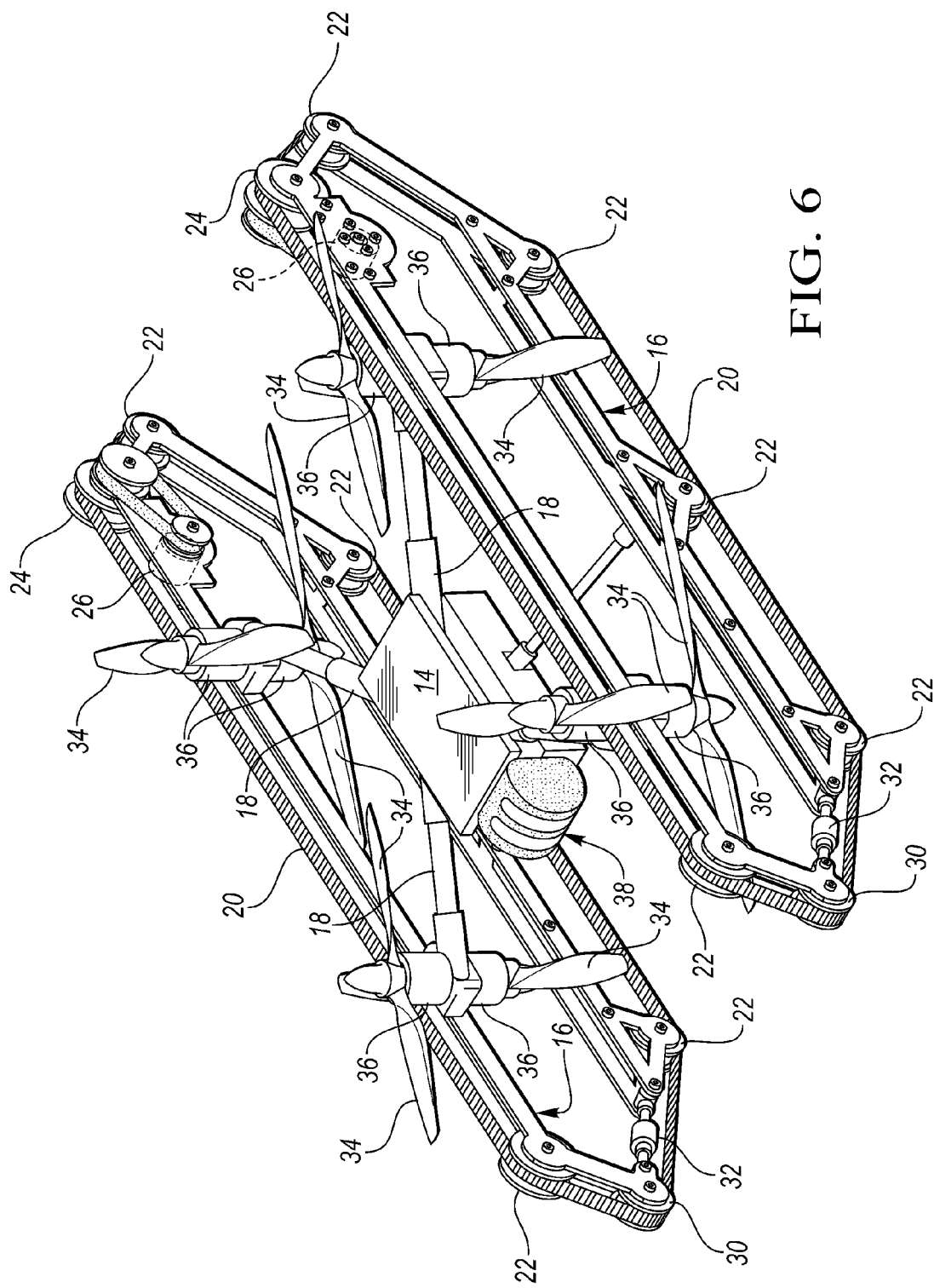
FIG. 6 is isometric view of the unmanned air-ground vehicle illustrating an alternative embodiment that includes additional propellers.

Referring to FIG. 6, an alternative embodiment that includes additional propellers 34 and propeller drives 36 located on the top of the side portions 16 of the frame 12 is illustrated. The additional set of propellers 34 and propeller drives 36 increases the power output capability of the vehicle 10 when operating in the flying mode.

The additional propellers 34 may be configured to park in positions where the propellers 34 are substantially parallel to the side portions 16 of the frame 12. In the alternative, a configuration that includes multiple blades of two or more that are configured to either fold into positions where the multiple blades overlap each other or where the multiple blades shift to positions that point in the same direction, the propeller blades 34 may be positioned in storage or parked positions that range from substantially parallel to the side portions 16 of the frame 12 to substantially perpendicular to the side portions 16 of the frame 12, so that the blades do not extend laterally outward substantially beyond the frame 12.

Figure 7:
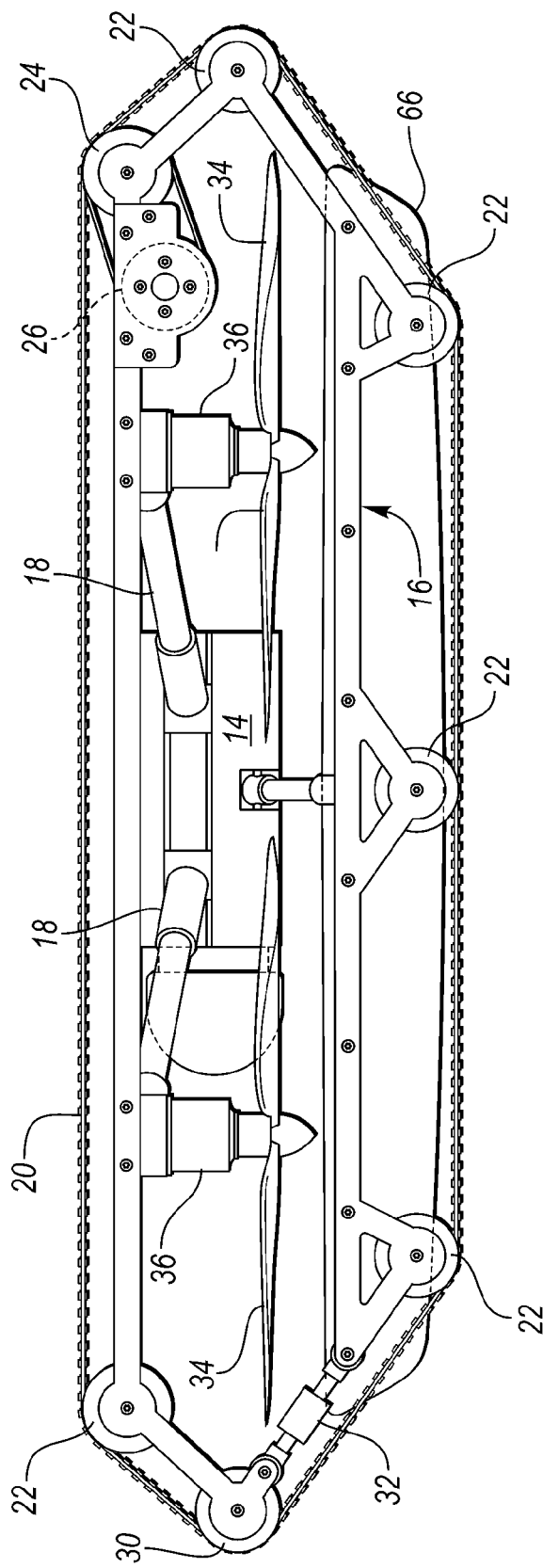
FIG. 7 is a side view of the unmanned air-ground vehicle illustrating an alternative embodiment that includes a pontoon.
Figure 8:
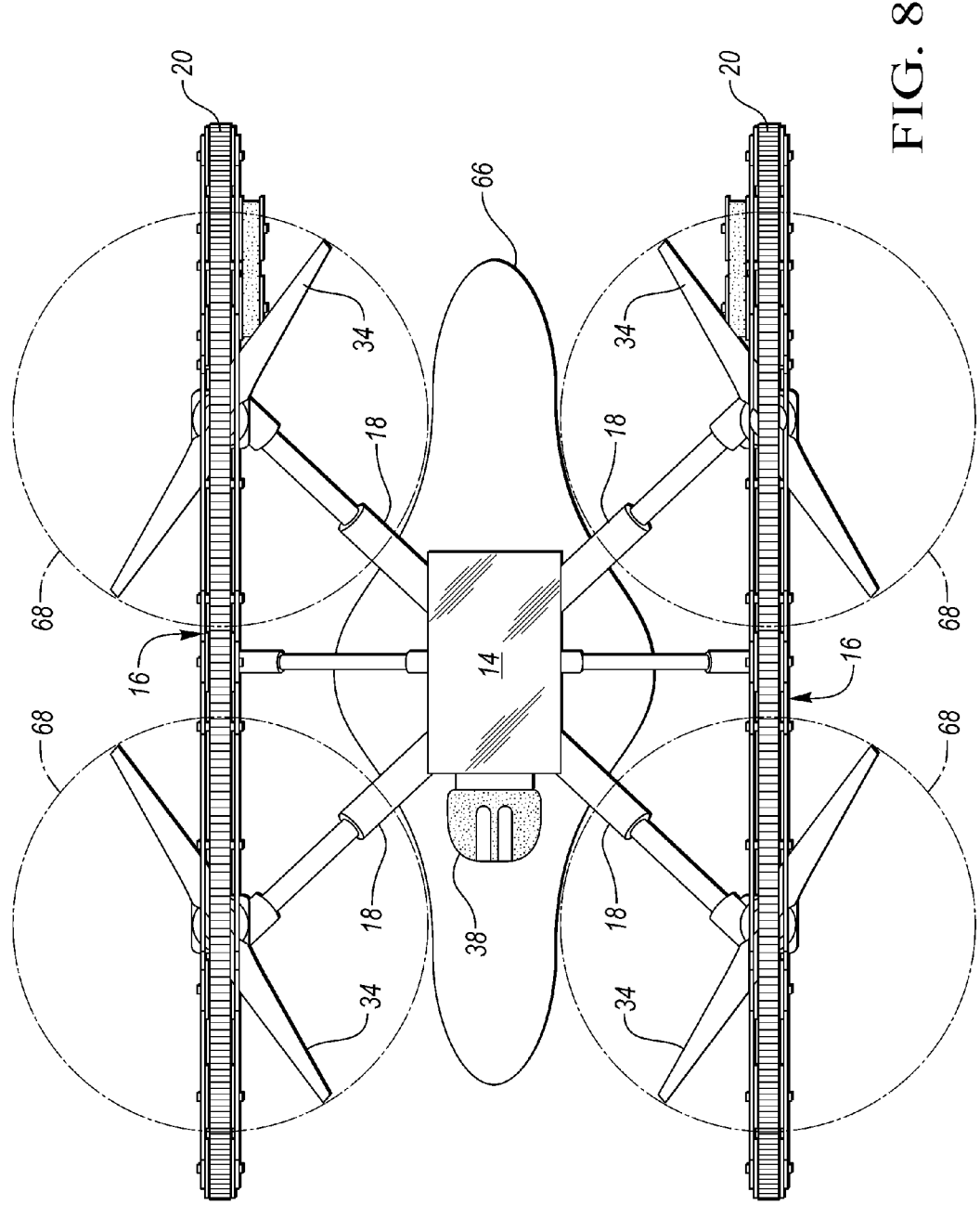
FIG. 8 is a top view of the unmanned air-ground vehicle illustrating the embodiment of FIG. 7.

Referring to FIGS. 7 and 8, another alternative embodiment may include at least one pontoon 66 that is attached to the frame 12 and allows the vehicle 10 to float and operate in a water mode. As depicted in FIG. 8, the pontoon 66 may a single pontoon that is designed not to overlap with the footprint 68 of the propellers 34, so that the pontoon does not restrict the airflow of the propellers 34 when the vehicle 10 is operating in the flying mode. In the alternative, multiple pontoons may be used. For example, two smaller pontoons may be connected to the side portions 16 of the frame 12. The pontoon 66 may also be placed at a level lower than the center portion 14 of the frame 12 (where the controller 56 and the battery 48 may be housed), the track drive motors 26, propeller drives 36, and other various electrical components, so that the electrical components stay above a water line when the vehicle 10 is operating in the water mode. The center portion 14 of the frame 12 (where the controller 56 and the battery 48 may be housed), the track drive motors 26, propeller drives 36, and other various electrical components may also be encased in waterproof housings to prevent damage to the electrical components when the vehicle 10 is operating in the water mode.

The tracks 20 may be used to propel the vehicle 10 through the water when the vehicle 10 is operating in the water mode. Alternative embodiments that include ground drives such as wheels may also be used to propel the vehicle 10 through the water when the vehicle 10 is operating in the water mode. The vehicle may also include a water drive that may be comprised of water jets or a propeller that is operatively linked to a power source, such as an electric motor or internal combustion engine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An unmanned air-ground vehicle comprising:
   a frame having a center portion connecting two substantially parallel transversely spaced apart track supports;
   two tracks generally forming loops, each track disposed about one of the track supports;
   two track drive motors, each connected to the frame and configured to propel one of the two tracks about the track supports;
   a plurality of propellers, each having a propeller drive motor, attached to the frame and disposed within the loops formed by the tracks, wherein the tracks are configured to propel the vehicle in a ground mode, and the propellers are configured to propel the vehicle in a flying mode; and
   a collapsible mechanism that transitions the track supports between ready and storage positions and secures the track supports to the center portion in both the ready position and the storage position, wherein the track supports are spatially closer in proximity to the center portion and a footprint of the vehicle is smaller in the ready position relative to the storage position.

2. The vehicle of claim 1, wherein the plurality of propellers are configured to park in storage positions, the storage positions ranging from substantially parallel to the track supports to substantially perpendicular to the track supports so that the blades of the propellers do not extend laterally outward substantially beyond the frame, when the vehicle is operating in the ground mode.

3. The vehicle of claim 1, further comprising a controller configured to control the track drive motors in the ground mode and the propeller drive motors in the flying mode.

4. The vehicle of claim 3, further comprising a human machine interface that wirelessly communicates with the controller allowing a user to control the vehicle in the ground mode or the flying mode.

5. The vehicle of claim 4, further comprising an image capturing device connected to the frame that provides feedback to the human machine interface.

6. The vehicle of claim 5, wherein the image capturing device is shiftably mounted to the frame in order to vary the field of view of the image capturing device.

7. The vehicle of claim 1, wherein a least one pontoon is attached to the frame.

8. The vehicle of claim 1, wherein the collapsible mechanism is a telescoping mechanism.

9. A vertical take-off and landing unmanned air-ground vehicle comprising:
   a frame having a center portion and two substantially parallel transversely spaced apart side portions connected to the center portion;
   a ground drive, attached to the side portions, configured to propel the vehicle in a ground mode;
   a plurality of propellers, each having a propeller drive, attached to the frame and disposed within the side portions, wherein the plurality of propellers are configured to propel the vehicle in a flying mode, and wherein the propeller blades are configured to shift into parked positions, the parked positions ranging from substantially parallel to the side portions of the frame to substantially perpendicular to the side portions of the frame so that the blades do not extend laterally outward substantially beyond the frame, when the vehicle is operating in the grounder mode; and
   a collapsible mechanism that transitions the side portions between ready and storage positions and secures the side portions to the center portion in both the ready position and the storage position, wherein the side portions are spatially closer in proximity to the center portion and a footprint of the vehicle is smaller in the ready position relative to the storage position.

10. The vehicle of claim 9, further comprising a controller configured to control the ground drive in the ground mode and the propeller drives in the flying mode.

11. The vehicle of claim 10, further comprising a human machine interface that wirelessly communicates with the controller allowing a user to control the vehicle in the ground mode or the flying mode.

12. The vehicle of claim 11, further comprising an image capturing device connected to the frame that provides feedback to the human machine interface.

13. The vehicle of claim 12, wherein the image capturing device provides video feedback to the human machine interface.

14. The vehicle of claim 12, wherein the image capturing device provides infrared feedback to the human machine interface.

15. The vehicle of claim 9, wherein the collapsible mechanism is a telescoping mechanism.

16. A vertical take-off and landing unmanned air-ground vehicle comprising:
   a frame having a center portion, two substantially parallel side portions, and a collapsible mechanism that connects the side portions to the center portion, enables the side portions to shift from a ready position to a storage position, secures the side portions to the center portion in both the ready position and the storage position, the side portions being spatially closer in proximity to the center portion and a footprint of the vehicle being smaller in the ready position relative to the storage position;

a ground drive, attached to the side portions, configured to propel the vehicle in a ground mode;

a plurality of propellers, each having a propeller drive, attached to the frame and disposed within the side portions, the plurality of propellers configured to propel the vehicle in a flying mode; and a battery attached to the frame configured to provide power to the ground drive and propeller drives.

17. The vehicle of claim 16, wherein the plurality of propellers are shifted into parked positions, the parked positions ranging from substantially parallel to the side portions of the frame to substantially perpendicular to the side portions of the frame so that the blades do not extend laterally outward substantially beyond the frame, when the vehicle is operating in the ground mode.

18. The vehicle of claim 16, where a photovoltaic cell attached to the frame is configured to recharge the battery.

19. The vehicle of claim 18, wherein the photovoltaic cell is configured to recharge the battery through power beaming.

20. The vehicle of claim 16, wherein the collapsible mechanism is a telescoping mechanism.

\* \* \* \* \*

UNITED STATES PATENT AND TRADEMARK OFFICE
CERTIFICATE OF CORRECTION

PATENT NO. : 9,623,968 B2
APPLICATION NO. : 14/538466
DATED : April 18, 2017
INVENTOR(S) : Rimanelli et al.

It is certified that error appears in the above-identified patent and that said Letters Patent is hereby corrected as shown below:

On the Title Page

Item (12) "Rimanelli" should read -- Rimanelli, et al. --.

Item (72) Inventor is corrected to read:
-- Jon Rimanelli, Grosse Pointe Woods (MI);
Nathan Secinaro, Seattle (WA) --.

Signed and Sealed this
Nineteenth Day of March, 2019

Andrei Iancu
*Director of the United States Patent and Trademark Office*